(12) United States Patent
Rubens et al.

(10) Patent No.: US 10,423,653 B2
(45) Date of Patent: Sep. 24, 2019

(54) TEMPLATE PROCESSING SYSTEM FOR DIGITAL FABRICATION

(71) Applicants: Robert Bosch Tool Corporation, Broadview, IL (US); Robert Bosch GmbH, Stuttgart (DE)

(72) Inventors: Jeremy Rubens, Palatine, IL (US); Jordan Majstorovic, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 43 days.

(21) Appl. No.: 15/610,947

(22) Filed: Jun. 1, 2017

(65) Prior Publication Data

US 2018/0349341 A1 Dec. 6, 2018

(51) Int. Cl.
  *G06K 21/06* (2006.01)
  *G06F 16/38* (2019.01)
  *G06F 16/56* (2019.01)

(52) U.S. Cl.
  CPC ............ *G06F 16/381* (2019.01); *G06F 16/56* (2019.01)

(58) Field of Classification Search
  CPC ... G06K 19/00; G06K 19/04; G06K 19/06131
  USPC ................................................. 235/495, 383
  See application file for complete search history.

(56) References Cited

U.S. PATENT DOCUMENTS

| | | | | |
|---|---|---|---|---|
| 5,999,908 | A * | 12/1999 | Abelow | G06Q 10/0639 705/7.32 |
| 8,634,089 | B2 * | 1/2014 | Keane | G06F 3/1211 358/1.15 |
| 2006/0129462 | A1 * | 6/2006 | Pankl | G06Q 30/06 705/26.81 |
| 2014/0067619 | A1 * | 3/2014 | Heimbach | G06Q 30/0603 705/26.81 |
| 2014/0244018 | A1 | 8/2014 | Bach et al. | |
| 2016/0096333 | A1 | 4/2016 | Trinkel et al. | |
| 2016/0364896 | A1 | 12/2016 | Herman et al. | |

* cited by examiner

*Primary Examiner* — Daniel St Cyr
(74) *Attorney, Agent, or Firm* — Kathy K. Takeguchi; Maginot Moore & Beck LLP (57) ABSTRACT

A computing system includes a processor system with at least one processing unit. The processor system is configured to receive image data of a template platform that is associated with fabricating a product. The processor system is configured to obtain barcode data associated with the image data. The processor system is configured to obtain customized data from the image data based on the barcode data. The customized data includes shape data corresponding to a structural attribute of the product. The processor system is configured to obtain template data of the product based on the barcode data. The template data includes product design data. The processor system is configured to provide fabrication data for a digital fabrication system to create the product in accordance with at least the customized data and the product design data. The processor system is configured to transmit the fabrication data to at least one fabrication tool of the digital fabrication system to create the product.

20 Claims, 6 Drawing Sheets

TEMPLATE PROCESSING SYSTEM FOR DIGITAL FABRICATION

FIELD OF THE INVENTION

This disclosure relates to a template processing system.

BACKGROUND

In many cases, digital fabrication tools require the use of modeling software, computer aided design (CAD) software, or the like. However, it may take a substantial amount of time and effort for some individuals, such as novice or less-experienced users, to use or learn how to use these software programs in order to create their products. As such, these digital fabrication tools are somewhat limited in their appeal to some individuals, such as novice or inexperienced users.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a computing system includes a processor system with at least one processing unit. The processor system is configured to receive image data of a template platform that is associated with fabricating a product. The processor system is configured to obtain barcode data associated with the image data. The processor system is configured to obtain customized data from the image data based on the barcode data. The customized data includes shape data corresponding to a structural attribute of the product. The processor system is configured to obtain template data of the product based on the barcode data. The template data includes product design data. The processor system is configured to provide fabrication data for a digital fabrication system to create the product in accordance with at least the customized data and the product design data. The processor system is configured to transmit the fabrication data to at least one fabrication tool of the digital fabrication system to create the product.

In an example embodiment, a computer-implemented method includes receiving, via a processor system including at least one processing unit, image data of a template platform that is associated with fabricating a product. The computer-implemented method includes obtaining, via the processor system, barcode data associated with the image data. The computer-implemented method includes obtaining, via the processor system, customized data from the image data based on the barcode data. The customized data includes shape data corresponding to a structural attribute of the product. The computer-implemented method includes obtaining, via the processor system, template data of the product based on the barcode data. The template data includes product design data. The computer-implemented method includes generating, via the processor system, fabrication data for a digital fabrication system to create the product in accordance with at least the customized data and the product design data. The computer-implemented method includes transmitting, via the processor system, the fabrication data to at least one fabrication tool of the digital fabrication system to create the product.

In an example embodiment, non-transitory computer-readable media comprises at least computer-readable data that, when executed by a processor system with at least one processing unit, performs a method that includes receiving image data of a template platform that is associated with fabricating a product. The method includes obtaining barcode data associated with the image data. The method includes obtaining customized data from the image data based on the barcode data. The customized data includes shape data corresponding to a structural attribute of the product. The method includes obtaining template data of the product based on the barcode data. The template data includes product design data. The method includes generating fabrication data for a digital fabrication system to create the product in accordance with at least the customized data and the product design data. The method includes transmitting the fabrication data to at least one fabrication tool of the digital fabrication system to create the product.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
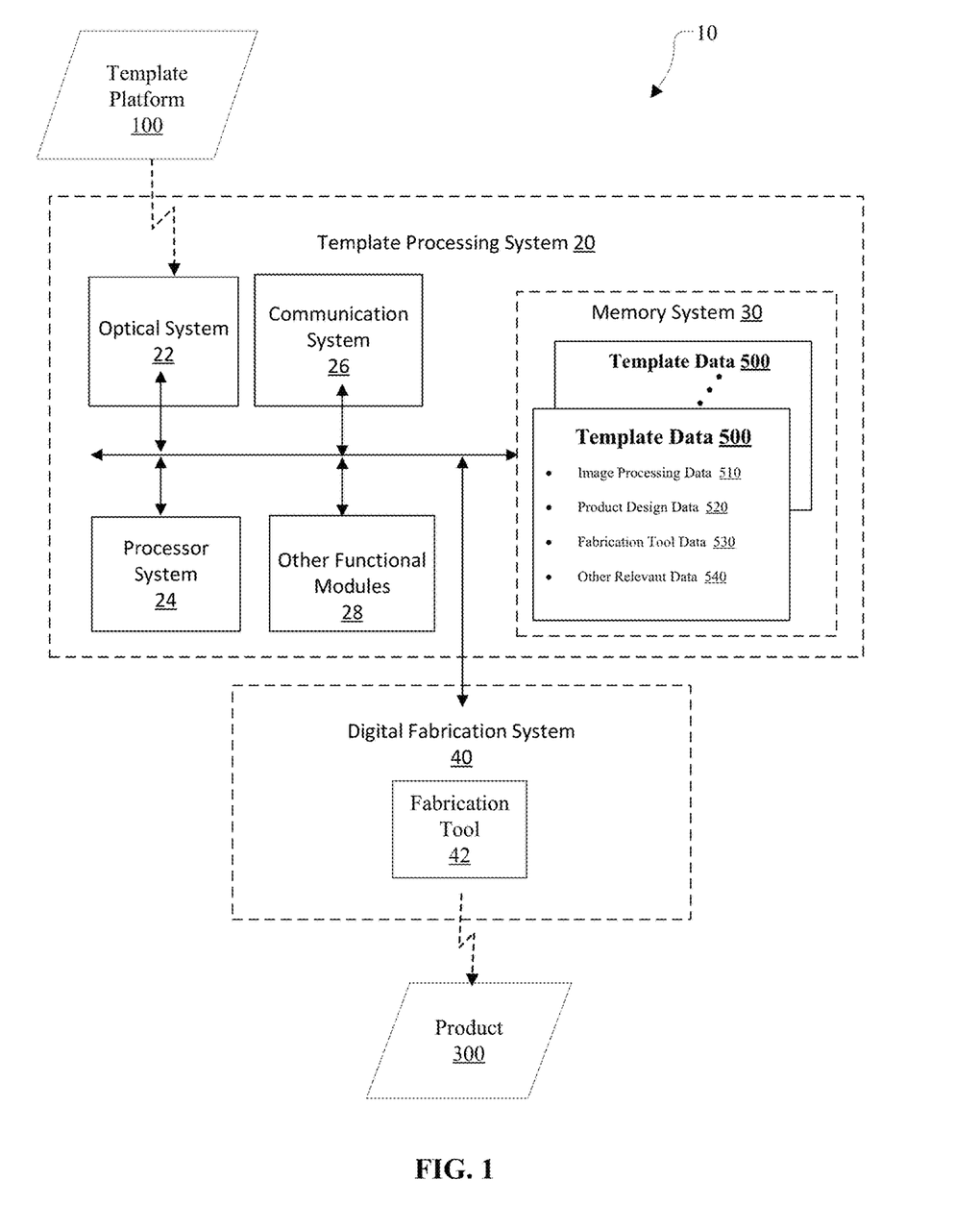
FIG. 1 is a block diagram of a system according to an example embodiment of this disclosure.

FIG. 1 is a diagram of a system 10 according to an example embodiment. In an example embodiment, the system 10 includes at least a template platform 100, a template processing system 20, and a digital fabrication system 40. In an example embodiment, the template processing system 20 is configured to generate image data 600 based on the template platform 100. In an example embodiment, the template processing system 20 is configured to process this image data 600 in accordance with corresponding template data 500 in the memory system 30. In an example embodiment, the template processing system 20 is configured to generate fabrication data 800 that is compatible with at least one fabrication tool 42 of the digital fabrication system 40. In an example embodiment, the template processing system 20 is remote, local, or integral with at least one fabrication tool 42 of the digital fabrication system 40. Accordingly, the template processing system 20 is advantageous in enabling a user, for example, to fabricate a customized version of a product 300 by simply drawing or inputting a design as customized data 400 into a designated region of the template platform 100. In this regard, the template processing system 20 is configured to generate fabrication data 800 of an appropriate type for the digital fabrication system 40 so that the user is not required to directly interface with and utilize modeling and/or CAD software. In addition, the template processing system 20 is configured to acquire and utilize template data 500 regarding various features (e.g., technical features, functional features, etc.) such that the user does is not burdened with providing these features of the product 300, which may be time consuming to design and implement.

In an example embodiment, the template platform 100 is any suitable medium that includes machine readable data 112, which is registered with the template processing system 20 and associated with a product 300 to be fabricated by the digital fabrication system 40. In an example embodiment, the product 300 can be any suitable component of an article or any suitable article, which can be technically produced by the digital fabrication system 40. Also, the product 300 can include non-fabricated components, such as mechanical fasteners, other parts, etc. Non-limiting examples of products 300 include model cars, model rocket designs, model airplane designs, toys, decorative pieces, keychains, jewelry, model lamp shades, boxes, leather cut goods (e.g., wallets, bags, belts, etc.), or any components of articles, or any suitable articles. In addition, the template platform 100 also enables a user to provide customized data 400 with ease. For instance, in FIG. 1, the template platform 100 is a physical template, such as a physical sheet of paper with at least machine readable data 112 printed thereon. In this case, with such a print-out, the template platform 100 enables a user to provide customized data 400 on the print-out itself. As another example, the template platform 100 is an electronic or digital template, such as an electronic or digital image with at least machine readable data 112 displayed thereon. In this case, with such an electronic or digital image, the template platform 100 enables a user to provide customized data 400 via a touchscreen or any suitable input means of a suitable electronic device (e.g., smartphone, tablet computer, etc.) with ease. In this regard, the template platform 100 provides a user with a simple means to create a customized version of the product 300 at the front end while enabling a template processing system 20 to handle other aspects (e.g., technical aspects) of the product 300 at the back end in accordance with the machine readable data 112.

In an example embodiment, as discussed above, the template platform 100 includes machine readable data 112. In an example embodiment, the machine readable data 112 is a barcode, any suitable technology, or any combination thereof. In this regard, for example, the barcode can be a linear barcode, a matrix 2D barcode, a quick response (QR) code, or any machine readable code. In an example embodiment, upon being decoded, the machine readable data 112 (e.g. the barcode) is configured to provide barcode data 700. In an example embodiment, the barcode data 700 includes a link, an ID, a filename, a memory address, or other relevant data that provides information (or provides access to information) pertaining to the processing of the template platform 100 and/or the creation of the product 300. For instance, in an example embodiment, upon decoding the machine readable data 112, the template processing system 20 is provided with barcode data 700, which includes a link and/or access to template data 500, as shown in FIG. 1.

In an example embodiment, as discussed above, the template platform 100 is configured to receive customized data 400 relating to the creation of a product 300. In an example embodiment, the customized data 400 refers to user input. For instance, the customized data 400 can be a sketch, a drawing, an image, a design, a pattern, a character, and/or any suitable input. In an example embodiment, the template platform 100 can provide limits, boundaries, guidance, instructions, and/or the like to assist a user in providing customized data 400 that is valid, acceptable, and/or technically feasible. For example, the template platform 100 can include at least one designated region for customized data 400. Also, in an example embodiment, the template platform 100 can include reference data to assist the user in visualizing at least one other non-customizable feature of the product 300 when providing customized data 400. In this regard, the receipt of customized data 400 via the template platform 100 is advantageous in enabling a user to create a customized version of the product 300 via the template processing system 20 with ease.

In an example embodiment, the template processing system 20 includes an optical system 22, which is configured to generate image data 600 relating to the template platform 100. Also, in an example embodiment, the optical system 22 is configured to read and decode machine readable data 112. In this regard, for instance, the optical system 22 is any suitable electronic device, such as a camera system, an imaging system, a laser scanner, any suitable optical technology, or any combination thereof.

Figure 2:
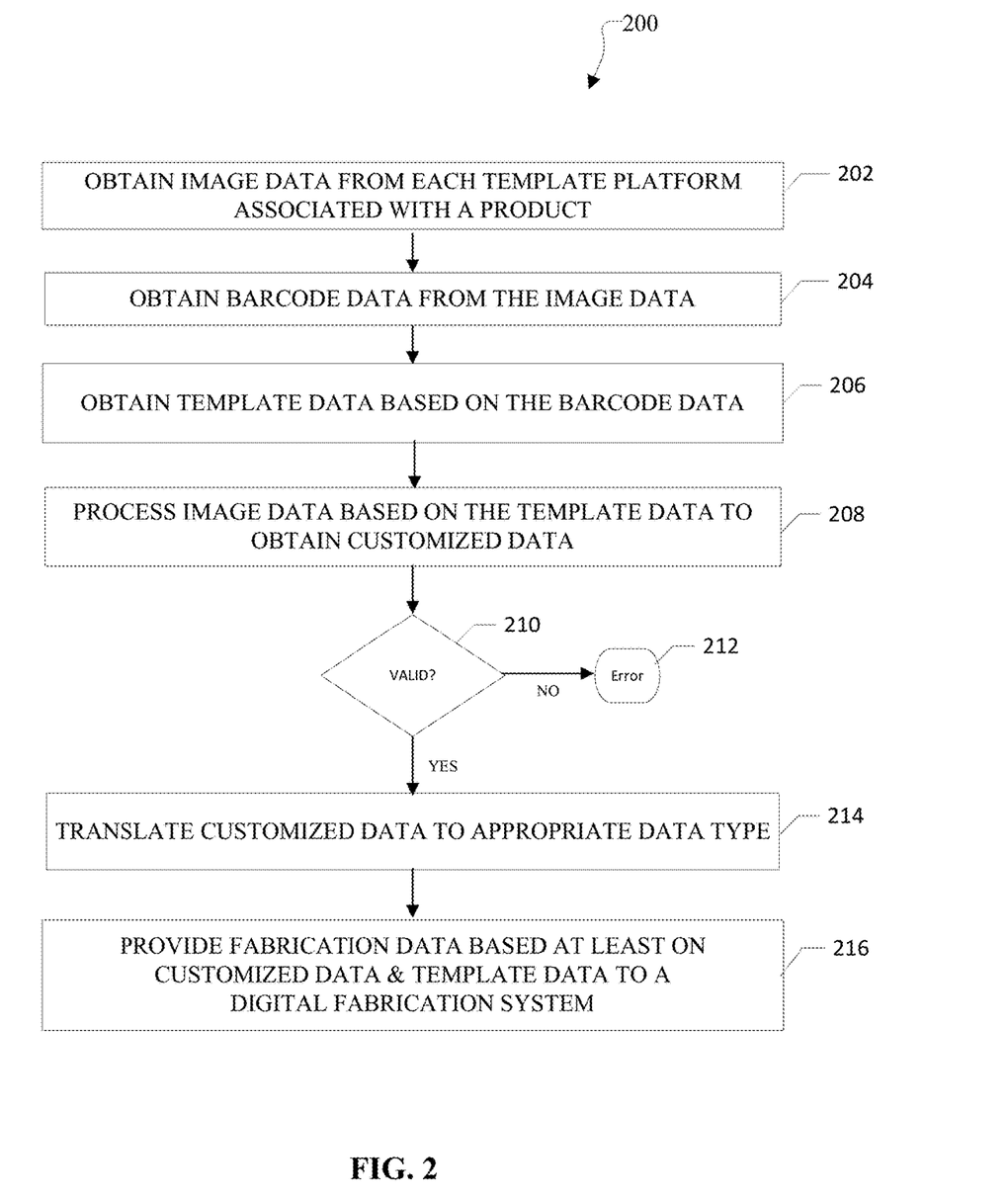
FIG. 2 is a flow diagram of a process according to an example embodiment of this disclosure.

In an example embodiment, the template processing system 20 includes a processor system 24. In an example embodiment, the processor system 24 includes at least one processing unit or computing unit. In an example embodiment, the processor system 24 is configured to receive image data 600 from the optical system 22. In an example embodiment, the processor system 24 is configured to access template data 500 from the memory system 30. In an example embodiment, the processor system 24 is configured to perform a number of operations and provide fabrication data 800 to the digital fabrication system 40, as shown in FIGS. 1-2.

In an example embodiment, the template processing system 20 includes a communication system 26. In an example embodiment, the communication system 26 includes suitable communications technology that enables components (e.g., optical system 22, processor system 24, other functional modules 28, and memory system 30) of the template processing system 20 to communicate with each other. Also, in an example embodiment, the communication system 26 includes suitable communications technology that enables the template processing system 20 to communicate with the digital fabrication system 40. Further, if the template platform 100 is an electronic or digital image on a computing device (e.g., smartphone, tablet, PC, etc.), then the communication system 26 includes suitable communications technology that enables the template platform 100 to communicate with the template processing system 20. In an example embodiment, the communication system 26 includes wired-based technology, wireless-based technology, and/or a combination thereof to enable data transfer. In an example embodiment, the communication system 26 includes a wired network, a wireless network, or a combination thereof. In an example embodiment, the communication system 26 includes any suitable type of computer network and/or architecture. In an example embodiment, the communication system 26 includes a connection to the Internet. In an example embodiment, the communication system 26 includes short-range communication (e.g., BLUETOOTH™, RFID, Wi-Fi, etc.) or any appropriate communication range.

In an example embodiment, the template processing system 20 includes other functional modules 28. In an example embodiment, the other functional modules 28 include hardware, software, or a combination thereof. For instance, the other functional modules 28 can include logic circuitry, an operating system, I/O devices (e.g., a display), other technology, or any combination thereof. More specifically, in an example embodiment, the other functional modules 28 are configured to enable the template processing system 20 to operate and function, as disclosed herein, based on the desired configuration, components, and architecture of the template processing system 20. In this regard, for example, the other functional modules 28 may differ in a configuration of the system 10 in which the memory 30 is local to the processor system 24 compared to that in which the memory is remote to the processor system 24. As another example, the other functional modules 28 may differ in a configuration of the system 10 in which the template processing system 20 is local to the fabrication tool 42 compared to that in which the template processing system 20 is remote to the fabrication tool 42.

In an example embodiment, the template processing system 20 includes a memory system 30. In an example embodiment, the memory system 30 is a computer or electronic storage system, which is configured to store and provide access to various data (e.g., template data 500 in association with barcode data 700) to enable operations and functionality, as disclosed herein. In an example embodiment, the memory system 30 comprises a single device or a plurality of devices. In an example embodiment, the memory system 30 can include electrical, electronic, magnetic, optical, semiconductor, electromagnetic, or any suitable technology. For instance, in an example embodiment, the memory system 30 can include random access memory (RAM), read only memory (ROM), flash memory, a disk drive, a memory card, an optical storage device, a magnetic storage device, a memory module, any suitable type of memory device, or any combination thereof. In an example embodiment, with respect to the template processing system 20, the memory system 30 is local, remote, or a combination thereof (e.g., partly local and partly remote). In an example embodiment, the memory system 30 includes at least a cloud-based storage system (e.g. cloud-based database system), which is remote from the other components (e.g., optical system 22 or processor system 24) of the template processing system 20.

In an example embodiment, the memory system 30 includes at least template data 500, which is associated with the machine readable data 112 and which provides various data that enables the template processing system 20 to create a customized version of a product 300 based on the customized data 400 of the template platform 100. In this regard, for instance, the memory system 30 includes at least image processing data 510, product design data 520, fabrication tool data 530, and other relevant data 540. In an example embodiment, the image processing data 510 relates to the processing of the image data 600. In this regard, the image processing data 510 includes, for instance, various data relating to the obtainment of the customized data 400 from the image data 600. In an example embodiment, the image processing data 510 includes edge detection modules, coordinate data, image recognition modules, image analysis modules, color detection modules, or any combination thereof that enables the template processing system 20 to identify and obtain customized data 400 from the image data 600.

In an example embodiment, the memory system 30 includes at least product design data 520. In an example embodiment, the product design data 520 includes various data that enables the digital fabrication system 40 to create a customized version of the product 300 corresponding to the template platform 100. In this regard, for example, the product design data 520 includes non-customizable data (e.g., technical data, functional data, etc.) associated with creating a customized version of the product 300. For instance, the product design data 520 can include reproduction data, layout data, scaling data, sizing data, other data related to the product 300, or any combination thereof. Also, the product design data 520 can include information that relates to and/or accounts for at least one other component (e.g. mechanical fastener), which is needed to build the product 300 and which is not being fabricated by the digital fabrication system 40.

In an example embodiment, the memory system 30 includes at least fabrication tool data 530. In an example embodiment, the fabrication tool data 530 includes various data that relates to providing the proper settings, instructions, parameters, or any combination thereof for a respective fabrication tool 42 to create a customized version of the product 300. In an example embodiment, the fabrication tool data 530 includes, for instance, power settings, speed settings, and other data relating to a respective fabrication tool 42.

In an example embodiment, the memory system 30 includes other relevant data 540, which enables a customized version of the product 300 to be created based on the template platform 100. In an example embodiment, the other relevant data 540 can include instructions, parameters, any suitable data, or any combination thereof. For instance, in an example embodiment, the other relevant data 540 includes at least validation data. In an example embodiment, the validation data is configured to provide the template processing system 20 with the ability to ensure that the customized data 400 and/or any user input data is appropriate and suitable for the creation of the product 300.

In an example embodiment, the digital fabrication system 40 includes at least one fabrication tool 42. In an example embodiment, the fabrication tool 42 includes hardware, software, or a combination thereof. In this regard, the fabrication tool 42 is a laser cutter, a laser engraver, a three-dimensional printer (3D-printer), computer aided design (CAD) technology, computer numerical controlled milling machines, drag knife machines, any suitable fabrication technology, or any combination thereof.

FIG. 2 is a flow diagram of a process associated with the system 10 of FIG. 1 according to an example embodiment. In an example embodiment, the system 10 is configured to receive customized data 400 for a product 300 via at least one template platform 100. Each template platform 100 enables a user to provide customized data 400 with ease. In this regard, for example, the template platform 100 does not require a user to have prerequisite knowledge of any particular type of modeling and/or design software. Instead, the user merely provides customized data 400 (e.g., a sketch, an image, a drawing, etc.) in at least one designated region of the template platform 100. Upon providing the customized data 400 via at least one template platform 100, the user can activate a trigger such that the optical system 22 is configured to generate image data 600 of each template platform 100. In an example embodiment, the image data 600 is transmitted to the processor system 24, which is configured to perform a process 200, as described below. More specifically, the process 200 is performed, in a general context, when the processor system 24 executes computer-readable data (e.g., computer-executable data), which is stored on non-transitory computer readable media. Generally, the computer-readable data can include various instructions, data structures, applications, routines, programs, modules, procedures, other software components, or any combination thereof.

At step 202, in an example embodiment, the processor system 24 is configured to obtain image data 600 of at least one template platform 100, which is associated with a product 300. In this regard, for example, one type of product 300 can require a single template platform 100 whereas another type of product 300 can require a plurality of template platforms 100. In each of these cases, the optical system 22 (e.g., a camera system) is configured to produce the image data 600, which is transmitted to and received by the processor system 24.

At step 204, in an example embodiment, the processor system 24 is configured to obtain barcode data 700 based on the machine readable data 112 (e.g. the barcode) of the image data 600. More specifically, in an example embodiment, the optical system 22 is configured to read and decode the machine readable data 112. Alternatively, in another embodiment, the other functional modules 28 can include decoding circuitry for decoding the machine readable data 112 from the image data 600. In an example embodiment, upon receiving barcode data 700 based on a decoding of the machine readable data 112 (e.g., the barcode), the processor system 24 is configured to proceed to step 206.

At step 206, in an example embodiment, the processor system 24 is configured to obtain template data 500 based on the barcode data 700. Upon acquiring the barcode data 700, the processor system 24 is provided with a link and/or access to template data 500 that is stored in the memory system 30, as shown in FIG. 1. For instance, if the template platform 100 is for building a model car as the product 300, then the barcode data 700, which is associated with the machine readable data 112 (e.g., the barcode), provides the processor system 24 with access to template data 500 that specifically corresponds to building that model car as the product 300.

At step 208, in an example embodiment, the processor system 24 is configured to process the image data 600 in accordance with the template data 500 (e.g., the image processing data 510). In this regard, for example, the processor system 24 is configured to implement at least one image processing procedure and/or algorithm (e.g., via edge detection modules, image recognition modules, image analysis modules, color detection modules, or any combination thereof) that enables the template processing system 20 to identify and obtain customized data 400 from the image data 600.

At step 210, in an example embodiment, the processor system 24 is configured to determine if the customized data 400 (or any user input) is valid or not valid. In this regard, before providing fabrication data 800 to the digital fabrication system 40, the processor system 24 is configured to determine if the customized data 400 meets predetermined criteria of the product 300, the digital fabrication system 40, or both the product 300 and the digital fabrication system 40. In an example embodiment, if the customized data 400 is deemed valid, then the processor system 24 proceeds to step 214. Alternatively, if the customized data 400 is deemed to be invalid, then the processor system 24 proceeds to step 212.

At step 212, in an example embodiment, when the customized data 400 is deemed invalid, the processor system 24 is configured to provide an error notification. For instance, in an example embodiment, this error notification is provided to the other functional modules 28, which can include an I/O device such as a display. In an example embodiment, this error notification can be provided to the digital fabrication system 40. In an example embodiment, if the template platform 100 is an electronic image displayed on an electronic device (e.g., smartphone, tablet, or other device), then the processor system 24 can send the error message to that electronic device.

At step 214, in an example embodiment, the processor system 24 is configured to translate or convert the customized data 400 to an appropriate data type or format, which is required by the digital fabrication system 40. For instance, if the digital fabrication system 40 includes a 3D printer, then the processor system 24 is configured to translate or convert the customized data 400 into the appropriate data type (e.g., G-code data, CAD data, STL data, or any suitable data) for the 3D printer. As another example, if the digital fabrication system 40 includes a laser engraver, then the processor system 24 is configured to translate or convert the customized data 400 into the appropriate data type (e.g., vector graphics data, raster graphics data, or the like) for the laser engraver.

At step 216, in an example embodiment, the processor system 24 is configured to generate and/or provide fabrication data 800 to the digital fabrication system 40. In an example embodiment, the fabrication data 800 is based at least on the customized data 400, which was translated into the appropriate data type in step 214, and any relevant template data 500 (e.g., product design data 520, fabrication tool data 530, and other relevant data 540), which was acquired at step 206. In this regard, the fabrication data 800 provides sufficient data for the digital fabrication system 40 to create a customized version of the product 300 or at least one part that contributes to a customized version of the product 300.

Figure 3:
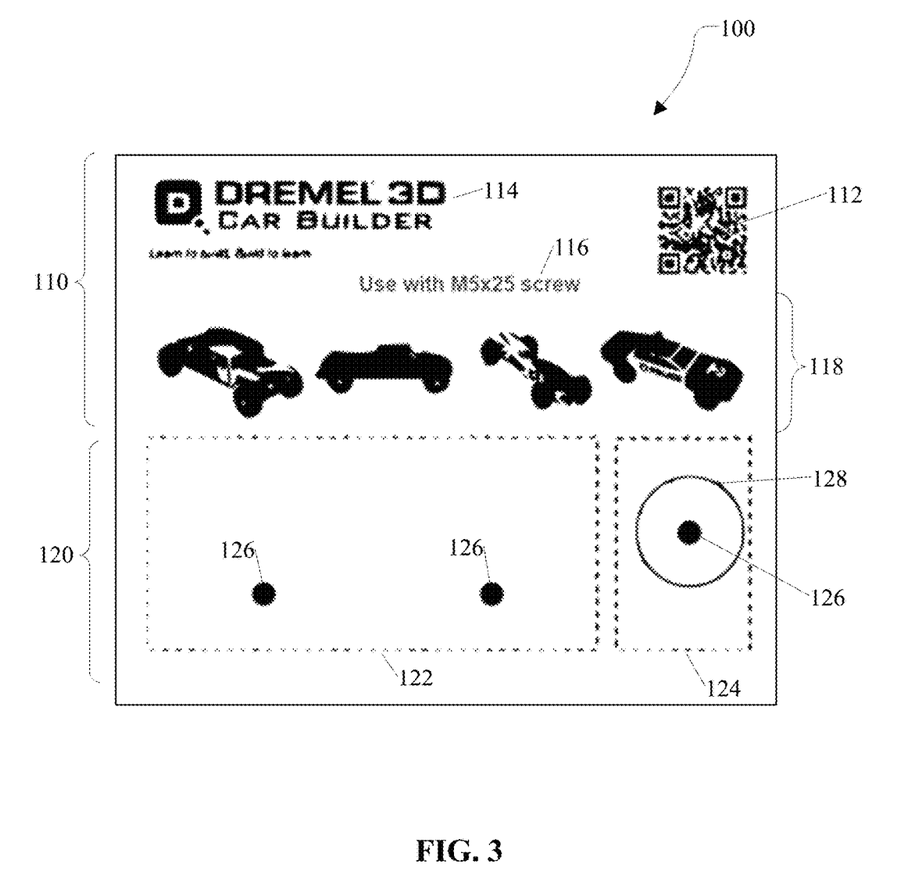
FIG. 3 illustrates a non-limiting example of a template platform according to an example embodiment of this disclosure.

FIG. 3 illustrates a non-limiting example of the template platform 100 according to an example embodiment. In an example embodiment, the template platform 100 includes at least a first section 110 and a second section 120. In an example embodiment, the first section 110 includes at least machine readable data 112 (e.g. QR code). In addition, the first section 110 can also include other relevant data, such as, e.g., identifying data 114, supplemental data 116, example data 118, or any combination thereof. In an example embodiment, the identifying data 114 can include any classifying, naming, or distinguishing type of information that is associated with the template platform 100, the product 300, the developer, the user, or any combination thereof. For instance, in FIG. 3, the identifying data 114 includes "Dremel® 3D Car Builder," which identifies the template platform 100 as being provided by Dremel® and the product 300 as being a 3D model car. In an example embodiment, the supplemental data 116 includes any information relating to the template platform 100, the product 300, the process of fabricating the product 300, or any combination thereof. In this case, for instance, the supplemental data 116 includes information that notifies the user that "M5x25 screws" should be used in building a 3D model car in association with this template platform 100. In an example embodiment, the example data 118 can include examples of the product 300. In FIG. 3, for instance, the example data 118 includes illustrations of examples of customized versions of the product 300, which may be helpful to a user when providing customized data 400 for features of the model car on the template platform 100.

In an example embodiment, the second section 120 includes at least one designated region, which is configured to receive customized data 400 relating to a product 300. For instance, in FIG. 3, the template platform 100 includes a first region 122 and a second region 124. In an example embodiment, the first region 122 is configured to receive customized data 400, which includes shape data that corresponds to a structural attribute of the product 300 such as the actual shape of a model car body. In this regard, the first region 122 includes reference data, such as two reference points 126, which indicate the placement of mechanical fasteners on the model car body. In this case, the mechanical fasteners are screws, which are configured to connect the wheels to the model car body.

In an example embodiment, the second region 124 is configured to receive customized data 400 relating to each wheel of the model car. In this regard, to facilitate the receipt of proper customized data 400, the second region includes reference data. For example, in FIG. 3, the reference data includes a reference point 126 and a reference circle 128. In this case, the reference point 126 indicates the placement of a mechanical fastener (e.g., a screw) that connects a respective wheel to the model car body. Also, the reference circle 128 indicates an outline of each wheel of the model car.

Advantageously, as demonstrated by the example of FIG. 3, the inclusion of the reference data on the template platform 100 enables a user to visualize the placement of non-customizable features of the product 300. The reference data also advantageously assists a user in providing customized data 400, which would be deemed valid in accordance with non-customizable features of the product 300. Moreover, during image processing, the processor system 24 can use the reference data to determine if the customized data and/or user input is valid. For instance, with regard to the receipt of body shape data 402 as customized data 400 in the first region 122 of FIG. 3 as an example, the processor system 24 is configured to determine that the body shape data 402 is valid provided that the body shape data 402 (i) resides entirely within the designated first region 122, (ii) encompasses both reference points 126, and (iii) is sufficiently spaced from the reference points 126 to accommodate the mechanical fasteners and wheels.

Figure 4:
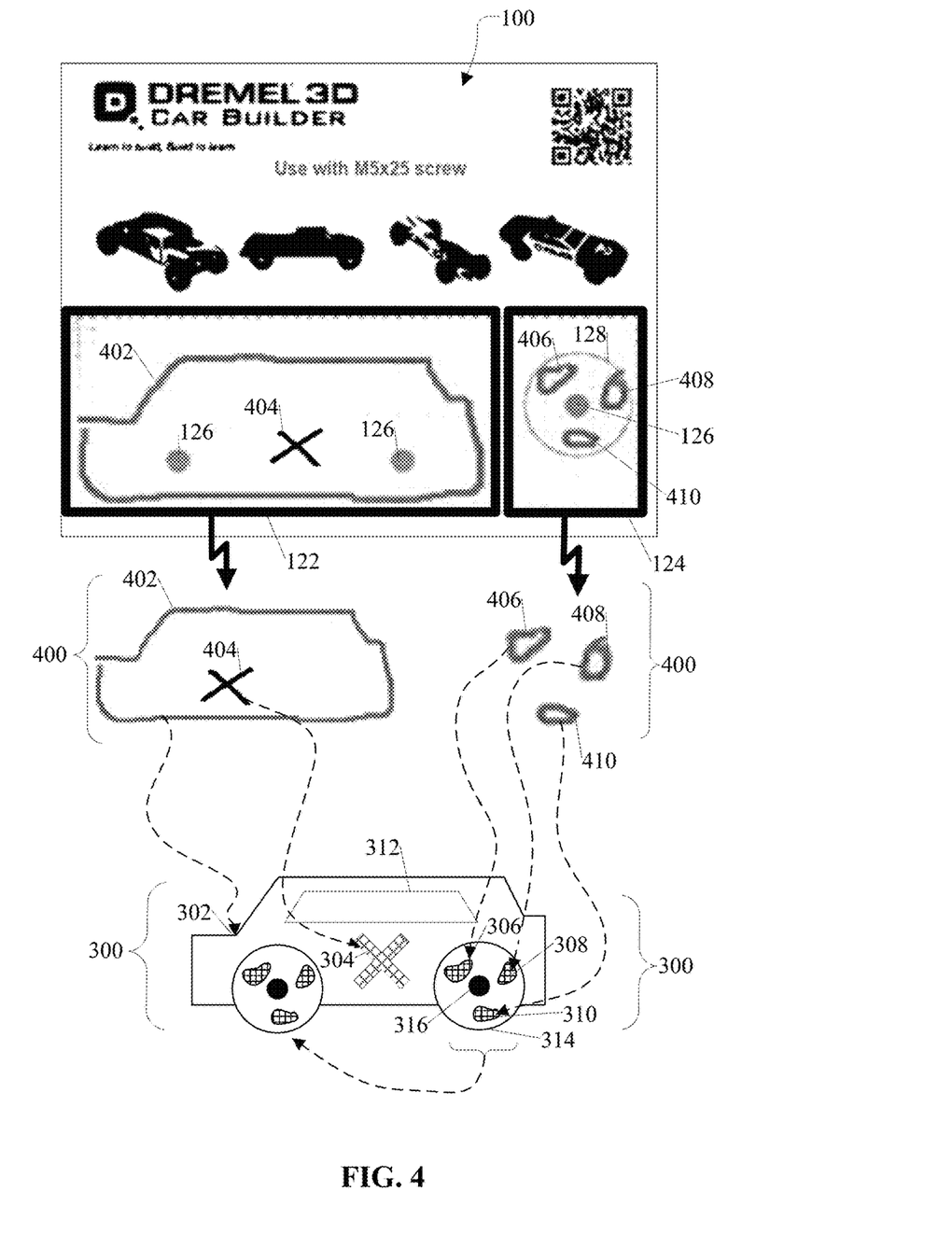
FIG. 4 is a diagram illustrating a representative relationship between customized data of the template platform and features of a product according to an example embodiment of this disclosure.

FIG. 4 illustrates the template platform 100 of FIG. 3 along with a non-limiting instance of customized data 400. More specifically, in this example, the template platform 100 includes customized data 400 in each of the designated regions 122 and 124. For instance, in the first region of FIG. 4, the customized data 400 includes body shape data 402 and body design data 404. Meanwhile, in the second region of FIG. 4, the customized data 400 includes wheel design data 406, 408, and 410.

In addition, FIG. 4 illustrates a mapping of the customized data 400 of the template platform 100 in relation to features of a corresponding product 300, which has been fabricated by the digital fabrication system 40. More specifically, this mapping is shown below and in relation to the template platform 100. In this case, the template platform 100 is for a model car builder in which the product 300 is a model car. As shown in FIG. 4, the actual body shape 302 of the product 300 (i.e., the model car) corresponds to the body shape data 402. Also, the body design data 404, which includes an "X" design, corresponds to the "X" engraved marking 304 on the actual body of the model car. Furthermore, the wheel design data 406, 408, and 410 can be found as actual designs 306, 308, and 310 on each of the wheels 314 of the model car. Accordingly, upon obtaining valid customized data 400, the template processing system 20 is configured to translate the customized data 400 into the appropriate data type and generate fabrication data 800 based thereupon.

Also, in an example embodiment, the product 300 is fabricated in accordance with template data 500. For instance, as shown in FIG. 4, the product 300 (e.g., the model car) can optionally include an engraved marking for a window 312, which is fabricated in accordance with template data 500, e.g. the product design data 520. In addition, the actual model car includes wheels 314, whereby each wheel 314, as shown by reference circle 128 on template platform 100, is fabricated in accordance with template data 500. Moreover, the template data 500 includes various data, such as product design data 520 that includes at least reproduction data and layout data. In this example, the reproduction data indicates that (i) data related to the first region 122 is to be reproduced at least three times such that these parts can be stacked together to form a model car body of sufficient thickness and (ii) data related to the second region 124 is to be reproduced four times such that there are four wheels for the model car body. Meanwhile, the layout data indicates how each of these parts (e.g., three model car bodies, four wheels, etc.) are to be laid out on the material (e.g., wood), which is to be processed by the digital fabrication system 40. Also, this model car includes holes to receive mechanical fasteners 316 (e.g., screws) to attach each wheel to the model car body. In this case, each of the holes is fabricated in accordance with template data 500, e.g. product design data 520. Furthermore, the template data 500 includes fabrication tool data 530 and other relevant data 540, which provide the necessary data to ensure that the product 300 is fabricated in an appropriate manner. In this regard, the template processing system 20 is configured to provide fabrication data 800 to the digital fabrication system 40 such that a customized version of the product 300 can be fabricated in accordance with template data 500 relating to certain features of the product 300, but also fabricated in accordance with the customized data 400 of the template platform 100.

Figure 5:
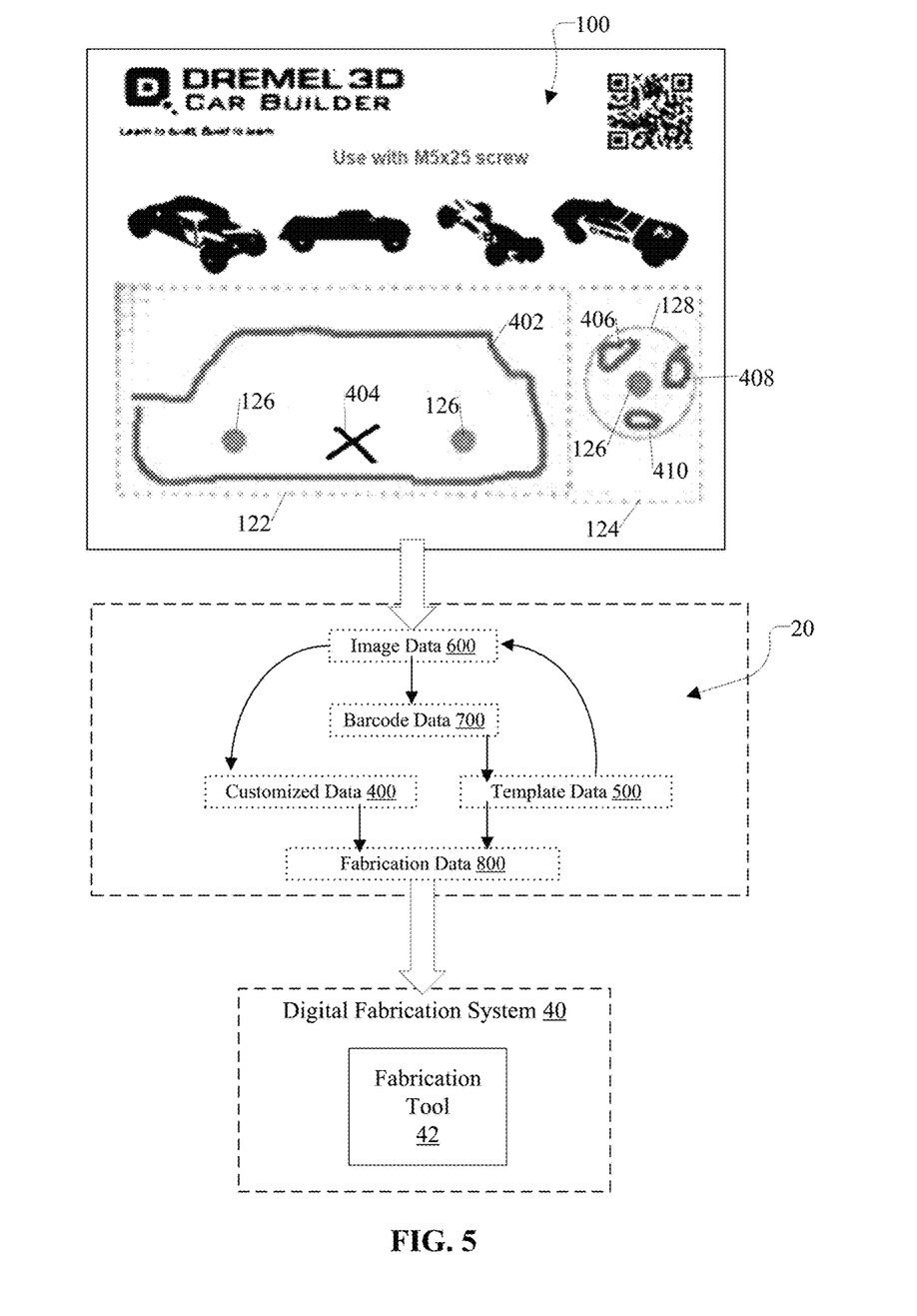
FIG. 5 is a diagram illustrating a data relationship associated with a template processing system in relation to the template platform of FIG. 4 and a digital fabrication system according to an example embodiment of this disclosure.

FIG. 5 is a diagram, which illustrates a relationship between a template platform 100 and a digital fabrication system 40 according to an example embodiment. In addition, FIG. 5 illustrates a simplified representation of a data relationship, which is associated with the template processing system 20. More specifically, as shown in FIGS. 1 and 5, the template processing system 20 includes an optical system 22, which is configured to generate image data 600 of the template platform 100. In addition, the template processing system 20 includes a processor system 24, which is configured to process the image data 600 and perform a number of operations, as discussed in FIG. 2. In this regard, for instance, the processor system 24 is configured to obtain barcode data 700 associated with the machine readable data 112 (e.g., the barcode), as captured by the optical system 22. In an example embodiment, the processor system 24 is configured to obtain template data 500 based on the barcode data 700. In an example embodiment, the processor system 24 is configured to obtain customized data 400 from the image data 600 in accordance with the template data 500. Further, as discussed in FIG. 2, the processor system 24 is configured to perform a number of operations (e.g., translate the customized data 400 into the appropriate data type and/or format) to generate fabrication data 800 for the digital fabrication system 40.

In an example embodiment, the digital fabrication system 40 includes at least one fabrication tool 42. For instance, in FIG. 5, the template platform 100 is for a model car builder, which is configured to map to a laser engraver as the fabrication tool 42. More specifically, in this example, after step 206 of FIG. 2, the processor system 24 is configured to at least extract the body shape data 402 from the image data 600, determine that the body shape data 402 is valid (e.g., forms a closed loop), translate this body shape data 402 into vector graphics data, and provide the necessary template data 500 (e.g., reproduction data, layout data, a high power setting, etc.) such that fabrication data 800 is generated for the laser engraver. Also, in FIG. 5, based on the template data 500, the processor system 24 is configured to at least extract the body design data 404, determine that the body design data 404 is valid (e.g. is within the bounds of the body shape data 402), translate this body design data 404 into raster graphics data, and provide the necessary template data 500 (e.g., reproduction data, layout data, a low power setting, etc.) such that fabrication data 800 is generated for the laser engraver. Additionally, based on the template data 500, the processor system 24 is configured to provide at least vector graphics data and the corresponding template data 500 for the reference circle 128 while being configured to extract the wheel design data 406, 408, and 410, determine that the wheel design data 406, 408, and 410 is valid (e.g., is within the bounds of the reference circle 128), translate this wheel design data 406, 408, and 410 into raster graphics data, and provide the necessary template data 500 (e.g., reproduction data, layout data, a low power setting, etc.) such that fabrication data 800 is generated for the laser engraver. Accordingly, as described in the example above, the template processing system 20 is configured to provide fabrication data 800 of the appropriate data type for the digital fabrication tool 42 in accordance with the customized data 400 and the template data 500.

As discussed above, FIG. 5 illustrates an example in which the template platform 100 of FIG. 4 maps to a single fabrication tool 42. However, the system 10 is not limited to this mapping and/or configuration. As another example, for instance, the digital fabrication system 40 can include a plurality of fabrication tools. More specifically, one or more template platforms 100, which are associated with a particular product 300 and which are registered with the template processing system 20, can correspond to one or more fabrication tools of a digital fabrication system 40. Accordingly, the system 10 is configured to advantageously create a customized version of the product 300 via one or more fabrication tools without requiring knowledge of how to use a plurality of different design and/or modeling software for each fabrication tool to do so.

Figure 6:
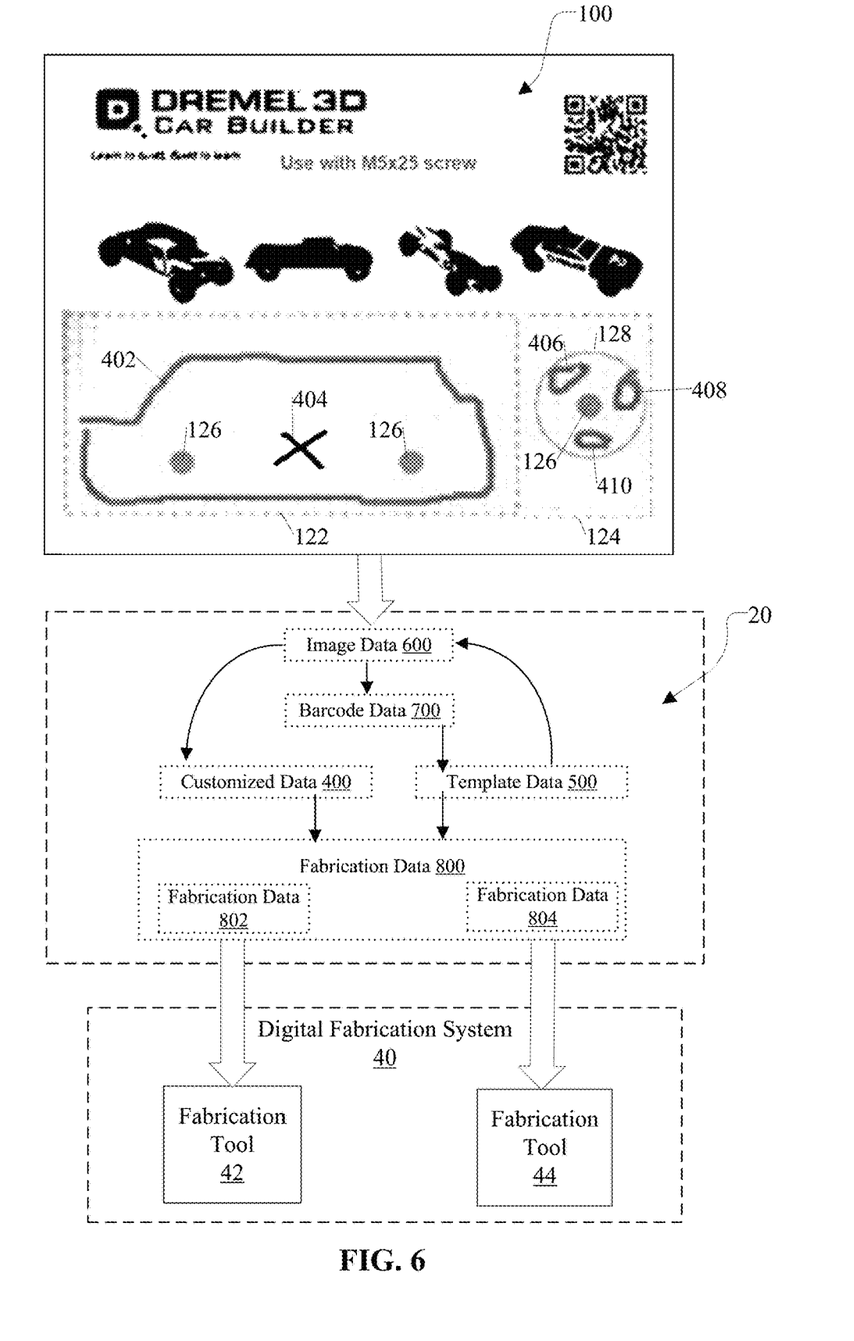
FIG. 6 is a diagram illustrating a data relationship associated with a template processing system in relation to the template platform of FIG. 4 and another digital fabrication system according to an example embodiment of this disclosure.

FIG. 6 is a diagram, which illustrates a relationship between a template platform 100 and another digital fabrication system 40 according to an example embodiment. In addition, FIG. 6 illustrates a simplified representation of a data relationship, which is associated with the template processing system 20. In this regard, the data relationship shown in FIG. 6 is similar or substantially similar to the data relationship shown in FIG. 5. However, in the example shown in FIG. 6, the template platform 100 maps to a plurality of fabrication tools (e.g., fabrication tool 42 and fabrication tool 44). For instance, in FIG. 6, the template platform 100 is for a model car builder in which the first region 122 is mapped to a laser engraver as the fabrication tool 42 and the second region 124 is mapped to a 3D-printer as the fabrication tool 44. In an example embodiment, the template data 500 provides this requisite mapping data. In this regard, upon identifying and extracting the customized data 400 of the first region 122, the processor system 24 is configured to perform operations similar to that discussed above with respect to FIG. 5 such that fabrication data 802 is generated for the laser engraver. Additionally, based on the template data 500, the processor system 24 is configured to provide 3D-printer data (e.g., G-code data) and corresponding template data 500 for the reference circle 128 while being configured to extract the wheel design data 406, 408, and 410, determine that the wheel design data 406, 408, and 410 is valid (e.g., is within the bounds of the reference circle 128), translate this wheel design data 406, 408, and 410 into 3D-printer data (e.g., G-code data), and provide the necessary template data 500 (e.g., reproduction data, layout data, an operational setting, etc.) such that fabrication data 804 for each wheel is generated for the 3D-printer. In this regard, for instance, the model car can include a car body that is fabricated from wood via the laser engraver and wheels that are fabricated from plastic via the 3D-printer. Accordingly, as described in the example above, based on the template data 500, the template processing system 20 is configured to process the image data 600 and provide fabrication data 800, which includes at least fabrication data 802 for the digital fabrication tool 42 and fabrication data 804 for the digital fabrication tool 44.

As discussed above, the template processing system 20 includes a number of advantageous features. For example, the template processing system 20 enables a user to create a customized version of the product 300 via a digital fabrication system 40 with an intuitive and easy-to-use template platform 100, such as a physical print-out or an electronic image. In this regard, the system 10 enables a user to utilize at least one fabrication tool 42 (e.g., laser engraver, 3D printer, a suitable device, or any combination thereof) without requiring the user to directly interface with and utilize modeling or design software. In this regard, the system 10 does not require a user to be familiar with modeling or design software to create a customized version of the product 300 via the digital fabrication system 40. Moreover, as aforementioned, the digital fabrication system 40 can include CAD technology as a fabrication tool 42 such that a CAD file is generated by the template processing system 20 as the product 300 itself based on customized data 400 received from at least one template platform 100 without the user having to utilize the CAD technology to create the CAD file.

In addition, the template platform 100 enables the user to focus on providing the creative aspects (e.g., the customized data 400) of a product 300 at the front end while the template processing system 20 handles the technical and functional aspects (e.g., product design data 520, fabrication tool data 530, etc.) of the product 300 at the back end. Moreover, the user merely provides the customized data 400 on at least one template platform 100 just once, but is able to produce this same customized version of the product 300 via the system 10 one or more times.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computing system comprising:
    a processor system including at least one processing unit, the processor system being configured to (a) receive image data of a template platform associated with fabricating a product, the image data including a barcode and customized data; (b) obtain barcode data associated with the barcode, (c) extract customized data from the image data based on the barcode data, the customized data including shape data corresponding to a structural attribute of the product, (d) obtain template data of the product based on the barcode data, the template data including product design data, (e) generate fabrication data for a digital fabrication system to create the product in accordance with at least the customized data and the product design data, and (f) transmit the fabrication data to at least one fabrication tool of the digital fabrication system to create the product.

2. The computing system of claim 1, further comprising:
    a camera system to provide the image data to the processor system.

3. The computing system of claim 2, wherein the template platform is a physical sheet of paper with the barcode printed on the paper.

4. The computing system of claim 2, wherein the template platform is an electronic image with the barcode displayed on the electronic image.

5. The computing system of claim 1, wherein:
    the customized data corresponds to user input provided via the template platform; and
    the processor system is configured to translate the customized data into vector graphics data, raster graphics data, G-code data, or any combination of vector graphics data, raster graphics data, and G-code data.

6. The computing system of claim 1, wherein the template platform includes reference data that indicates a non-customizable feature of the product.

7. The computing system of claim 1, wherein the processor system is configured to obtain fabrication tool data based on the barcode data, the fabrication tool data including information relating to settings of at least one fabrication tool of the digital fabrication system.

8. A computer-implemented method comprising:
    receiving, via a processor system including at least one processing unit, image data of a template platform associated with fabricating a product, the image data including a barcode and customized data;
    obtaining, via the processor system, barcode data associated with the barcode;
    extracting, via the processor system, customized data from the image data based on the barcode data, the customized data including shape data corresponding to a structural attribute of the product;
    obtaining, via the processor system, template data of the product based on the barcode data, the template data including product design data;
    generating, via the processor system, fabrication data for a digital fabrication system to create the product in accordance with at least the customized data and the product design data; and
    transmitting, via the processor system, the fabrication data to at least one fabrication tool of the digital fabrication system to create the product.

9. The computer-implemented method of claim 8, wherein the processor system is in communication with a camera system that produces the image data of the template platform.

10. The computer-implemented method of claim 8, wherein the template platform is a physical sheet of paper with the barcode printed on the paper.

11. The computer-implemented method of claim 8, wherein the template platform is an electronic image with the barcode displayed on the electronic image.

12. The computer-implemented method of claim 8, further comprising:
    translating the customized data into vector graphics data, raster graphics data, G-code data, or any combination of vector graphics data, raster graphics data, and G-code data,
    wherein the customized data corresponds to user input provided via the template platform.

13. The computer-implemented method of claim 8, wherein the template platform includes reference data that indicates a non-customizable feature of the product.

14. The computer-implemented method of claim 8, further comprising:
    obtaining fabrication tool data based on the barcode data, the fabrication tool data including information relating to settings on at least one fabrication tool of the digital fabrication system.

15. Non-transitory computer-readable media comprising at least computer-readable data that, when executed by a processor system with at least one processing unit, performs a method comprising:
    receiving image data of a template platform associated with fabricating a product, the image data including a barcode and customized data;
    obtaining barcode data associated with the barcode;
    extracting customized data from the image data based on the barcode data, the customized data including shape data corresponding to a structural attribute of the product;
    obtaining template data associated with the product based on the barcode data, the template data including product design data;
    generating fabrication data for a digital fabrication system to create the product in accordance with at least the customized data and the product design data; and
    transmitting, the fabrication data to at least one fabrication tool of the digital fabrication system to create the product.

16. The non-transitory computer-readable media of claim 15, wherein the image data of the template platform is obtained from a camera system.

17. The non-transitory computer-readable media of claim 15, wherein the template platform is a physical sheet of paper with the barcode printed on the paper.

18. The non-transitory computer-readable media of claim 15, wherein the method further comprises:
translating the customized data into vector graphics data, raster graphics data, G-code data, or any combination of vector graphics data, raster graphics data, and G-code data,
wherein the customized data corresponds to a drawing provided on the template platform.

19. The non-transitory computer-readable media of claim 15, wherein the template platform includes reference data that indicates a non-customizable feature of the product.

20. The non-transitory computer-readable media of claim 15, wherein the method further comprises:
obtaining fabrication tool data based on the barcode data, the fabrication tool data including information relating to settings of at least one fabrication tool of the digital fabrication system.

\* \* \* \* \*